United States Patent [19]

Malestein

[11] Patent Number: 4,715,323
[45] Date of Patent: Dec. 29, 1987

[54] APPARATUS FOR SUPPLYING FOOD TO A PLURALITY OF CAGES

[76] Inventor: Teus Malestein, Stationsweg 49, 3771 VC Barneveld, Netherlands

[21] Appl. No.: 786,083

[22] Filed: Oct. 10, 1985

[30] Foreign Application Priority Data

Oct. 16, 1984 [NL] Netherlands ............... 8403159
Oct. 16, 1984 [NL] Netherlands ............... 8403160

[51] Int. Cl.⁴ ..................... A01K 5/02; A01K 39/01
[52] U.S. Cl. .................................... 119/52 AF
[58] Field of Search ............ 119/51 CF, 52 AF, 52 B, 119/53, 57 R

[56] References Cited

U.S. PATENT DOCUMENTS

| | | | |
|---|---|---|---|
| 2,302,314 | 11/1942 | Haggart | 119/52 AF |
| 3,003,464 | 10/1961 | Bailey | 119/52 AF |
| 4,232,631 | 11/1980 | Smith, Sr. et al. | 119/53 X |
| 4,355,596 | 10/1982 | Peppler | 119/52 AF X |

Primary Examiner—Robert P. Swiatek
Attorney, Agent, or Firm—Larson and Taylor

[57] ABSTRACT

A food supplying system for large cage batteries (22), in which horizontal gutters (23, 36) with food transport, devices (27,37) are supplied at intervals by vertical supply pipes (12), which at their upper sides are connected to a supply conduit (11) preferably connected to a basic supply and return circuit (4,1,2,3,5,6,9,10).

12 Claims, 10 Drawing Figures

APPARATUS FOR SUPPLYING FOOD TO A PLURALITY OF CAGES

The invention relates to an apparatus for supplying food to a plurality of cages arranged in rows beside each other, each row being provided with a food gutter and means for supplying food to the said gutters.

In practice apparatus with a large number of cages are known, in which the rows of cages may have a length of 100 meter or even more. If with these apparatus the gutters are provided with means for transporting food in their longitudinal direction one needs a considerable time before the food is carried from the cages at the supply side to the cages at the other side. Using a common transport speed of, for instance, 5 meters per minute, a time period of 20 minutes is necessary for reaching the last cages. This means that the animals in the cages have picked out the food material they like most, so that the composition of the food offered to the last cages differs considerably from that offered to the first cages. For this reason and because it is necessary to supply the animals in the last cages with a sufficient quantity of food, this type of apparatus can only be used with a rearing of feeding system for animals, in which food is permanently available to them.

On the other hand it is known, that in many instances it has to be preferred to supply food only intermittently. This allows for a limitation or dosage of the food consumption. A practical means for intermittently supplying food to gutters extending along a long row of cages was a transportable supply silo moving at a controlled velocity along said gutters and supplying a constant quantity of food to the gutters. Because it is very expensive to automate such a system and in order to save labour, in practice the animals were fed only a few times a day, which means rather long intervals between the animals' meals. It has been found, that such long intervals are objectionable from an economic view point as well as from that of well-treating the animals. Animals are greatly bored by these long intervals and their longing for food can strongly develop, which may even lead to less effect of the food consumed, so that it is possible to get better grow or egg producing results with the same quantity of food, when avoiding this boring.

The invention aims to provide an animal rearing and feeding apparatus which is very suitable for automation, can contain practically each number of cages and avoids the above indicated disadvantages of known large batteries by providing that said gutters are provided with horizontal food transport means such as transport chains or transport cables provided with pushing members and in that a plurality of horizontally spaced mainly vertical food supply pipes debouch into said gutters.

The invention is applicable to apparatus having all cages on the same level as well as to apparatus in which a plurality of rows of cages is located the one above the other. In the latter case the invention preferably provides that each supply pipe is connected to each gutter of rows of cages located the one above the other.

An apparatus with a number of cages located above each other and with vertical food supply pipes has been depicted in the Canadian Patent Specification CA-A-978,037. With this known apparatus the supply pipes are mounted in a movable frame and each of them has to be supplied separately with food. Further the feeding means are trays extending into the cages, which means that the food will be available over only a limited length of tray, so that only a limited number of animals can be fed. For these reasons this known apparatus is unsuitable for large batteries having a large number of cages, whereas automation of the food supply is difficult due to the movability of the pipes' frame. This invention has eliminated these disadvantages.

With the invention it is possible to have the horizontal distance between the supply pipes as short as one may desire, so that the composition and quantity of food offered to all animals is practically the same.

A simple and reliable elaboration of the invention provides that the supply pipes are connected at their upper sides to a supply conduit having its own transport means.

Emptying the supply pipes and the supply conduit, for instance for replacing the food administered to the animals or for cleaning purposes, is made easy by providing that the supply pipes at their lower sides are connected to a return conduit.

In order to prevent undue circulation of food through the supply pipes toward the return conduit when no emptying or cleaning of these pipes is desired it can be provided that controllable valves are present in the supply pipes ahead of the said return conduit.

With an automatic food supply system, for instance of the type of the invention, it is desired to have a feed stock of sufficient capacity to serve the apparatus for a considerable time, otherwise the economy of automation would be very hypothetical. For this reason it seems obvious to connect the supply conduit to a stock silo. Then, however, problems may arise if it is desired to empty the food conduits or replace the food. In order to solve these problems a further elaboration of the invention provides an apparatus for supplying food to a plurality of cages having a basic supply and return circuit, said circuit being provided with a transport device for transporting food in it, and having an basic circuit supply portion connected to a silo, at least one supply conduit for supplying food to a plurality of cages and a basic circuit return portion, which is connected to at least one return conduit and the silo.

The embodiment of this elaboration of the invention with the inventive concept of having gutters with their own transport means and supplies at many locations along said gutters provides an excessively favourable apparatus, but each of these concepts per se gives already important improvements over the known art.

A further improvement of the last indicated elaboration of the invention exists in that the basic circuit supply portion is connected to the lower side of a silo and from there is connected at a first level to the supply conduits, from that level descends to a lower level, at that lower level is connected to the return conduits and from that lower level is connected to the upper side of the silo. This improvement provides a simple and effective food conduit system allowing emptying of the pipes and conduits and return of their contents to the silo.

Still a further elaboration provides an apparatus of the identified type with at least two silos in which the basic supply and return circuit is a closed circuit, the supply portion of it being connected to controllable supply devices from the said silos and the return portion being connected to controllable load devices of the said silos.

One of the important advantages of the invention is that it is possible to have a food gutter cooperate with cages at each side of it. Legal restrictions prescribe, in for instance the Netherlands, a certain length of feed gutter for each animal, for instance 10 cm for a laying-hen. This is, however, only for the animals at one side of the gutter, because animals at different sides of the gutter will not hinder each other.

The invention avoids the necessity of a silo movable along the gutters and therefore in principle allows for placing cages at both sides of the gutters. This will not only double the effectiveness of the gutters but also spare considerable space.

An embodiment of the invention, which enables this double effect of the gutters in an easy way, provides that the mainly vertical supply pipes pass through the gutters beside the food transport means of these gutters. This embodiment is very suitable in case of laying-hens with a relatively wide spacing between the cages, which allows also to mount an eggs-removal-belt beside the supply pipes. In that instance a preferred embodiment of the invention provides that stripping baffles are mounted in said gutters above said transport means and at both sides of the mainly vertical supply pipes.

Another solution provides that the gutters with at least a portion of their area pass through the mainly vertical supply pipes, the transport means of the gutters being provided with openings or otherwise pervious to food. This solution can be used for chickens or broilers needing only a narrow gutter and consequently little space between the cages.

According to a further embodiment a length saving of the gutter transport means is obtained by providing that the transport means of the gutters form a single chain or transport cable running to and fro alongside rows of cages at different levels.

Herewith it is preferred to provide that the transport means are surrounded by pipes extending between two adjacent gutters, in order to prevent food from dropping from the gutters if for any reason the animals do not eat all of it.

The invention in the following is elucidated by means of the drawing, in which.

Figure 1:
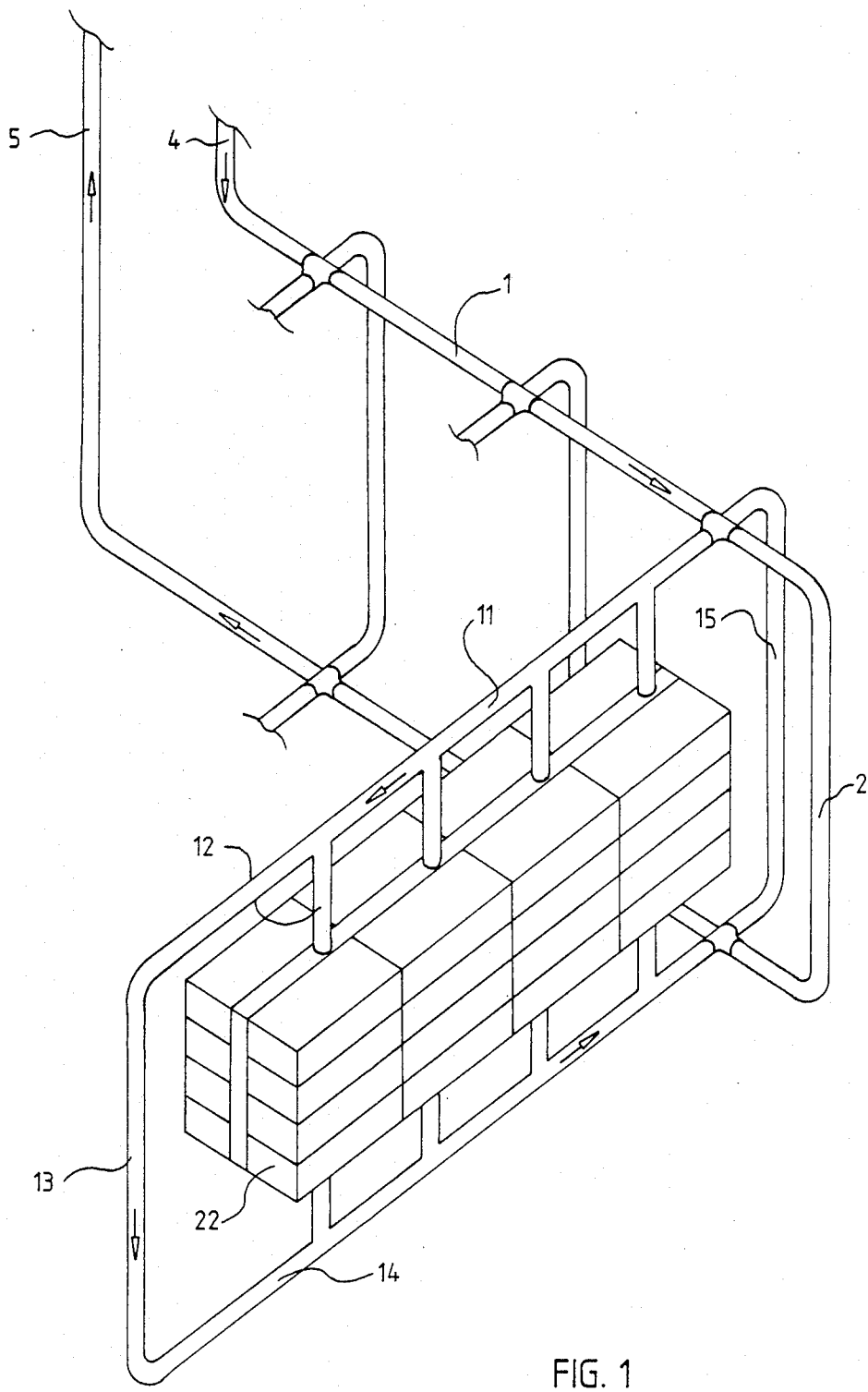
FIG. 1 shows schematically a perspective view of part of an apparatus according to the invention.

In FIG. 1 reference 1 indicates the horizontal supply portion of a basic supply circuit, whereas 2 is a vertical portion of the same circuit and 3 a horizontal return portion located at a lower level than portion 1.

Portions 1 and 3 are connected to vertical ducts 4 and 5 and form together with ducts 2, 6, 9 and 10 a closed circuit. The duct 6 passes through the upper portions of the silos 7 and 8 and is provided with controllable valve or closing member 17 and 18 controlling the connection from duct 6 on the one hand to silo 7 and 8 respectively on the other hand. Duct 10 is provided with controllable valve means 19 and 20 allowing or preventing transfer of food from silos 8 and 9 respectively into duct 10.

In the circuit 4, 1, 2, 3, 5, 6, 9 and 10 a continuous transport member, for instance a chain or cable provided with regularly spaced discs or other pushing members, is provided. Constructions with such transport members and wheels on which they run are well known and need no elucidation here.

Figure 2:
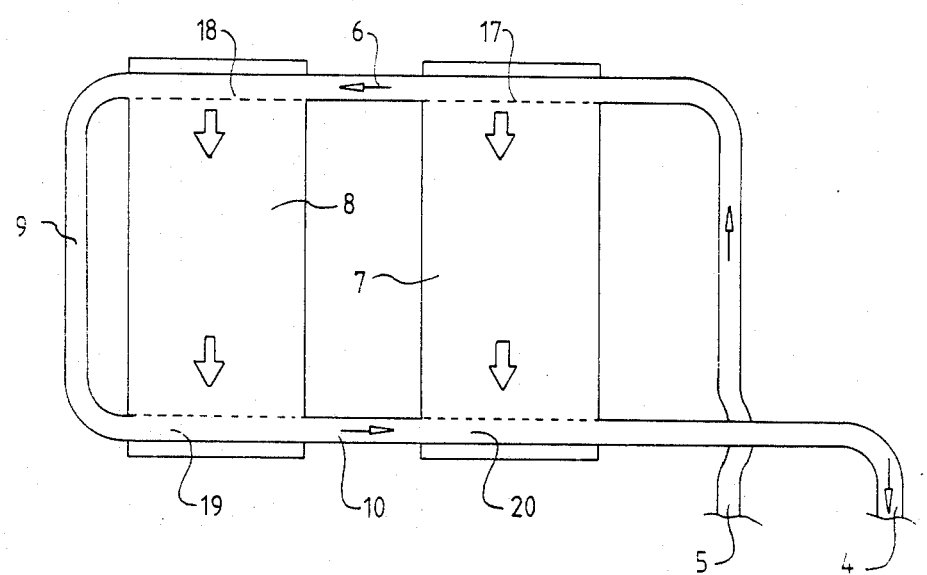
FIG. 2 shows the silos to be connected to the apparatus of FIG. 1.

Assuming that valve member 19 is closed and valve member 20 is opened the food from silo 7 will be carried through circuit members 4 and 1 to supply conduits 11. At regular intervals each supply conduit 11 is connected to vertical supply pipes 12 and its end to a vertical supply conduit portion 13, which at its lower end is bent back to form the return conduit 14. As will be explained further on, supply pipes 12 debouch into return conduit 14, but are provided with valve means normally preventing a throughput of food from supply conduit 11 through supply pipes 12 to return conduit 14. Any food arriving in a return conduit 14 is transferred to the basic circuit return portion 3 as shown in FIG. 1 and from there to the silo 8 shown in FIG. 2, provided closure member 17 is closed and closure member 18 is opened.

Figure 3A:
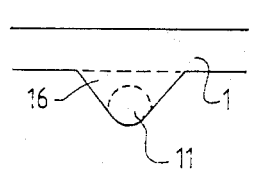
FIGS. 3A and 3B show examples of connections between the basic circuit supply portion and the supply conduits.
Figure 3B:
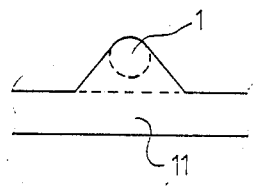

FIGS. 3A and 3B show two mutually perpendicular cross-sections through a connection of supply circuit portion 1 with a supply conduit 11. The maximum extensions of the transport means in 1 and 11 have been indicated with interrupted lines, which make it clear that food arriving from 1 can freely fall down to become in the reach of the transport means of a supply conduit 11.

Figure 4A:
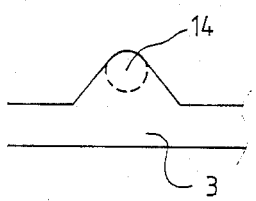
FIGS. 4A and 4B show examples of the connections between the return conduits and the basic circuit return portion.
Figure 4B:
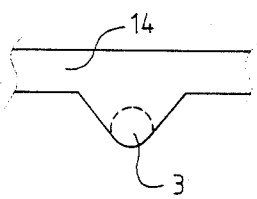

In exactly the same way FIGS. 4A and 4B elucidate the transfer of return food from 14 to 3.

If one desires to empty the circuit, conduits and pipes, one lets the transport means move in circuit 1, 2, 3, 5, 6, 9, 10 and 14 and in the conduits 23 and 24 with discharge valve members 19 and 20 in closed position and at least one of the load valve members 17 and 18 in open position. If it is desired to empty one of the silos, for instance 7, its lower valve member 20 is opened and its upper valve member 17 is closed. Therewith it is possible to transfer the content of the one silo to the other by putting the transport means in the circuit 4, 1, 2, 3, 5, 6, 9 and 10 in action and opening the discharge valve member 19 or 20 of the one silo and closing the load discharge member 17 or 18 of the other silo.

Figure 5:
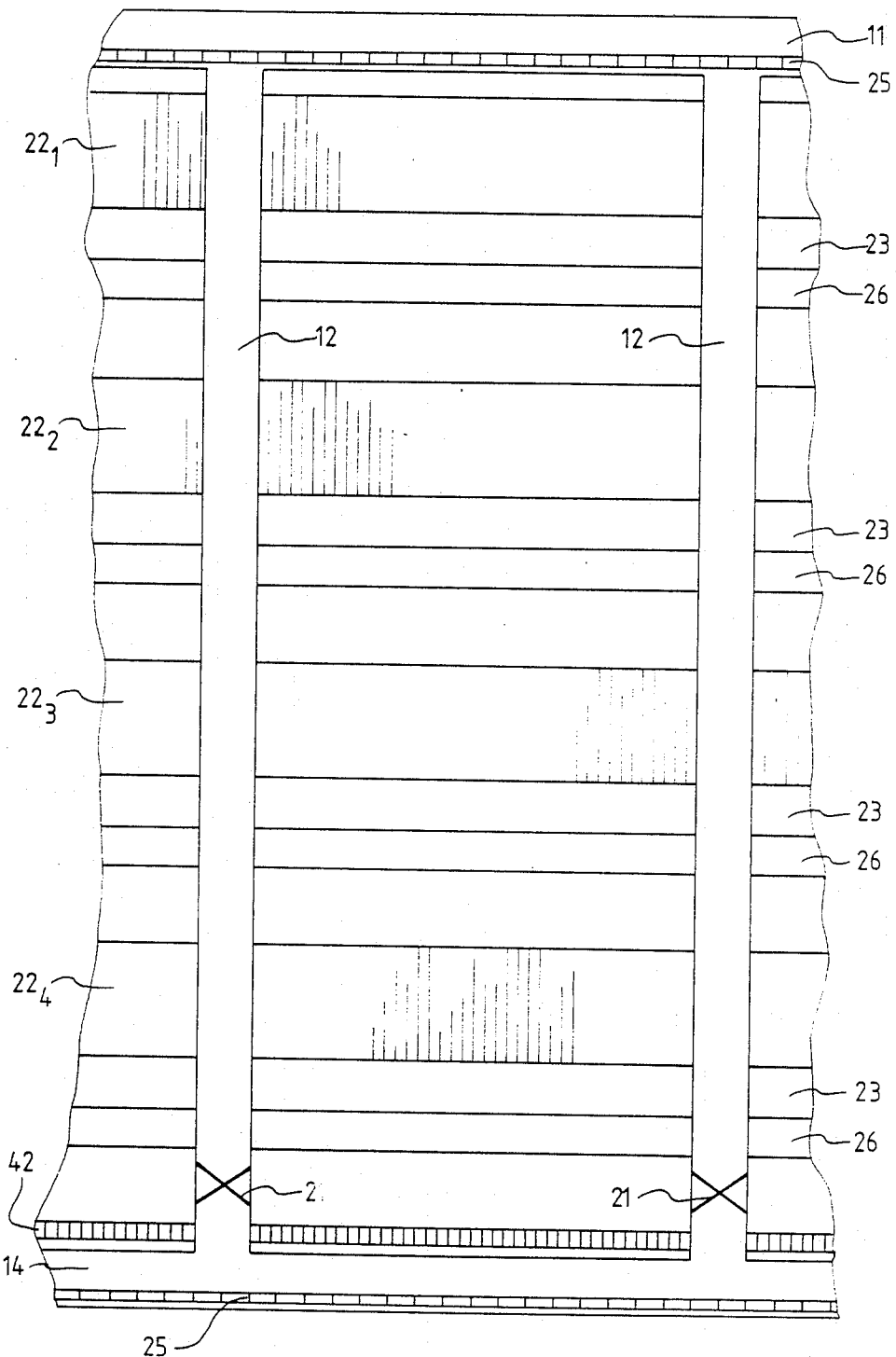
FIG. 5 shows schematically a partial view of an apparatus of the invention.
Figure 8:
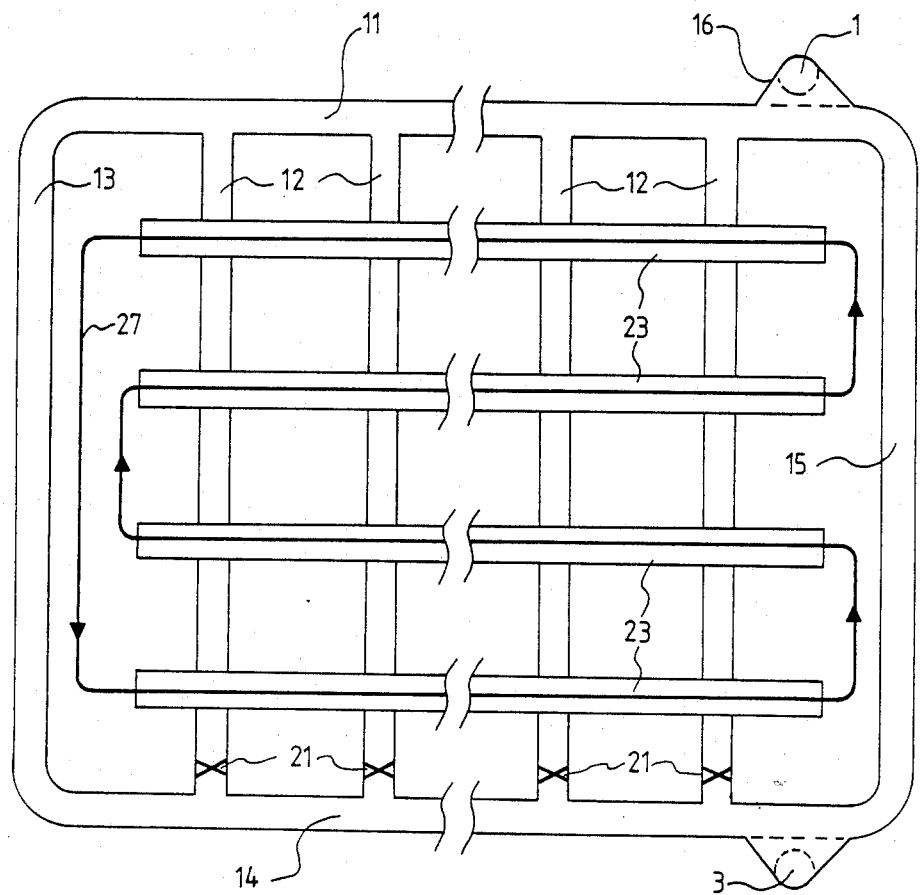
FIG. 8 shows schematically a view corresponding to that of FIG. 5 but on a smaller scale of a particular embodiment of the track of the transport means.

As clearly has been shown in FIG. 5 and 8 the supply pipes can be provided with valves 21. These valves normally are closed to avoid undue throughput of food through the pipes 12, which could give rise to a lack of food supply to the pipes 12 nearer to the vertical conduit 13. Opening these valves permits a ready emptying of all pipes and conduits, possibly with also a transfer of food from one silo to the other and even mixing of the contents of the silos. All these fetures are very useful when changing the composition of the food, administering medicines, emptying the tube system or transferring stock food from one silo to another (for instance if one silo has to be emptied) without any material disturbance of the feeding of the animals and without need of additional apparatus, whereas only very little labour is involved.

Figure 6:
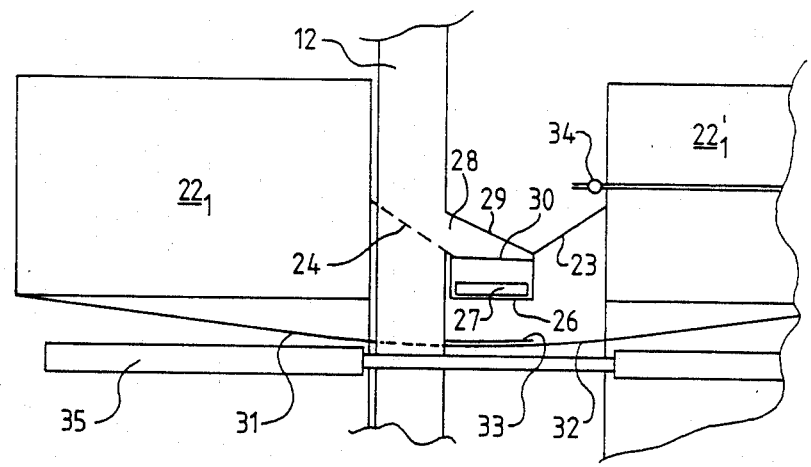
FIG. 6 shows a cross-section of a detail of a first embodiment.

The cage batteries 22 schematically shown in FIG. 1 have been shon again in FIG. 5, from which it is clear that four layers of cages $22_1$, $22_2$, $22_3$ and $22_4$ are located above each other at one side of an array of vertical pipes 12 and that four other layers of which the upper one $22'_1$ is visible in FIG. 6 are located at the other side of this array.

As shown in FIG. 5 the supply conduit 11 and the return conduit 14 contain transport means 25, which may be a chain having perforated links and moving in a closed loop through the conduits 11, 13, 14 and 15. The construction of such chains, their mounting and the means for driving them are known per se and do not form part of the invention.

FIG. 6 shows a partial cross-sectional view of a feeding gutter and a supply pipe 12 cooperating with it, as well as a cage of a row of cages $22_1$ at the left side of the supply pipe and part of a cage of a row of cages $22'_1$ at the right side.

The gutter 23 has two oblique side walls, one 24 of which has been shown in interrupted lines because it is behind the pipe 12, and a rectangular central portion 26. A transport chain 27 can be moved longitudinally in this central portion.

Supply pipe 12 is provided with a side opening 28, which debouches below a hood 29. In the region above the central gutter portion 26 this hood 29 is provided with horizontal stripping baffles with edges 30 for limiting the level of the food taken along by chain 27.

Further FIG. 6 shows a declining cage bottom 31. Any egg laid by a hen will roll down the cage bottom. A slightly bent support surface 32 joins the lower edges of the cage bottoms, so that the eggs will roll down toward the central part of 32. A belt 33 is supported by surface 32 and can be moved lengthwise for removal of the eggs.

It is remarked that the horizontal dimension of the oblique gutter sides 23 and 24, the external diameter of pipes 12 and a sufficient width of central gutter portion 26 and the egg removal belt 33 can be chosen such, that the food is at a convenient distance from the cages, so that sufficient width for transporting food and for removing eggs can be combined with a relatively small distance between the cages of rows $22_1$ and $22'_1$.

Of course further details necessary for having the cages batteries function well, such as a water supply 34 and suport rolls 35 for an excrement disposal belt are present also, but these details are not further discussed here, because they are no part of the invention.

Figure 7:
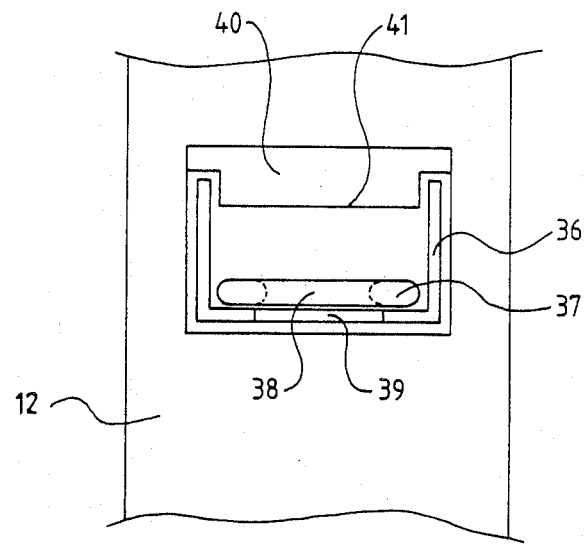
FIG. 7 shows a cross-section of a detail of a second embodiment.

FIG. 7 shows a supply pipe 12 on a larger scale, cooperating with another type of food gutter. This embodiment relates to a battery for rearing chickens of broilers. This type of poultry can come nearer to the food than is desired for grown-up hens. Therefor a smaller space between two cage batteries, such as $22_1$ and $22_2$ of FIG. 6 is possible.

In FIG. 7 a rectangular gutter 36 is provided with a chain 37, the links of which have an opening 38. The bottom of the gutter has inside the pipe 12 an opening 39. A baffle 40 with a lower stripping edge 41 limits the height of the food layer in the gutter 36 leaving the pipe 12. The openings 38 and 39 of the chain and the gutter warrant passage of the food toward the part of pipe 12 below the gutter 36, also if the spaces of the pipe 12 beside the gutter would clog, for instance by so-called bridging.

As shown in FIG. 5 and 8 the supply pipes are provided at their lower sides with controllable valves 21. With normal functioning of the apparatus these valves preferably are closed. When, however, the food has to be removed, one can shut off the supply from the silos and cause the transport means in the basic circuit 1,2,3,5,6,9,10,4 and chain 25 to move, so that all ducts 11, 13, 14, 15 are emptied, after which the valves 21 may be opened to empty also pipes 12. In case the food would tend to clog in the pipes 12 in the embodiment of FIG. 7 a short movement of chains 37 will cause the food to fall down in these pipes.

FIG. 8 shows schematically a preferred track of the transport chains 27 of the gutters 23. Of course the same track pattern can be used for other types of gutters and chains, such as 36 and 37. This track pattern is possible, because it does not matter in which direction the food is transported in the gutters. If desired, the vertical track portions (and the ends of the gutters) may be provided with tubes surrounding the chains in order to prevent food to fall down if for any reason the animals did not eat all of it before it reaches the end of the gutter.

In order to save construction height of the cage batteries the return conduits 14 may be mounted below the plant floor, which in FIG. 5 schematically is indicated at 42.

As clearly visible in FIG. 6 it is possibe that animals eat the food in a gutter, such as 23, from two sides. In order to have the animals feel well and to prevent some of them to be kept from sufficient feeding, a minimum length of food gutter per animal is necessary, in several countries even legally prescribed. With the invention not only a considerable floor saving is obtained, but also a doubling of the number of animals to be fed from a certain length of gutter. It should be emphasized, however, that the invention can also be used with cages at only one side of the gutters, for instance in already existing plants.

Though in the embodiments shown the supply pipes are vertical, it is also possible to have these pipes deviate from the vertical position, for instance if the invention is applied to cage batteries having a step shape with each higher cage somewhat retracted with respect to the cage below it.

Finally it is remarked, that the invention is as well suitable for grown-up hens, which have the habit to throw food away over the far side of the gutter with the upward movement after having made a picking move, as for broilers having this habit in a far less extend, for instance by using the embodiment of FIG. 6 or that of FIG. 7.

What is claimed is:

1. Apparatus for supplying food to a plurality of cages arranged in rows beside each other, said apparatus comprising a horizontally extending food gutter for each of said rows and means for supplying food to the said gutters, said gutters being provided with horizontal food transport means for tansporting food therealong and said food supplying means comprising a plurality of substantially vertical food supply pipes horizontally spaced along the length of each gutter which debouch into that gutter.

2. Apparatus according to claim 1, in which a plurality of rows of cages is located one above the other, and in which each supply pipe is connected to each gutter of the rows of cages, each said supply pipe being connected to a respective gutter at an intermediate point therealong and extending downwardly to the next gutter for the row therebelow.

3. Apparatus according to claim 1, in which the supply pipes are connected at their upper ends to a supply conduit having its own transport means.

4. Apparatus according to claim 1, in which the supply pipes at their lower ends are connected to a return conduit and in which controllable valves are present in the supply pipes ahead of the said return conduit.

5. Apparatus according to claim 1, in which the substantially vertical supply pipes pass through the respective gutters adjacent to the food transport means of these gutters.

6. Apparatus according to claim 1, in which the gutters with at least a portion of their area pass through the substantially vertical supply pipes, the transport means of the gutters being pervious to food.

7. Apparatus according to claim 1, in which stripping baffles are mounted in said gutters above said transport means and at both sides of the substantially vertical supply pipes.

8. Apparatus according to claim 1, further comprising a basic supply and return circuit, said circuit including a transport device for transporting food therein, and having a basic circuit supply portion connected to at least one silo, at least one supply conduit for supplying food to a plurality of cages and a basic circuit return portion which is connected to at least one return conduit and the at least one silo.

9. Apparatus according to claim 8, comprising at least two silos which form a closed circuit with the basic supply and return circuit, the supply portion being connected to controllable supply devices from each of the said silos and the return portion being connected to controllable load devices of each of the said silos.

10. Apparatus for supplying food to a plurality of cages having a basic supply and return circuit, said supply and return circuit being provided with a transport device for transporting food therein, and said basic supply and return circuit comprising a basic circuit supply portion and a basic circuit return portion, said basic circuit supply portion being connected to at least one silo and including at least one controllable supply device for controlling the supply of food from the at least one silo to said basic circuit supply portion, and said apparatus further comprising at least one supply conduit for supplying food to said plurality of cages and at least one return conduit connected to said basic circuit return portion which is connected to said at least one silo.

11. Apparatus according to claim 10, in which the basic circuit supply portion is connected to the lower side of the at least one silo and the basic circuit return portion is connected to the at least one upper side of the silo.

12. Apparatus according to claim 10, comprising at least two silos which form a closed circuit with the basic supply and return circuit, the basic circuit supply portion being connected to controllable supply devices from each of the said silos and the return portion being connected to controllable load devices of each of the said silos.

* * * * *